United States Patent [19]

Aratani

[11] Patent Number: 4,591,932
[45] Date of Patent: May 27, 1986

[54] AUTO-REVERSE MECHANISM FOR TAPE RECORDERS

[75] Inventor: Tetsuo Aratani, Kakuda, Japan

[73] Assignee: Alps Electric Co., Ltd., Japan

[21] Appl. No.: 431,123

[22] Filed: Sep. 30, 1982

[30] Foreign Application Priority Data

Dec. 18, 1981 [JP] Japan .................. 56-188959[U]

[51] Int. Cl.$^4$ .................. G11B 15/02; G11B 15/48
[52] U.S. Cl. .................. 360/74.1; 226/178; 226/188; 242/190; 360/74.2; 360/96.2; 360/137
[58] Field of Search .................. 360/74.1, 74.2, 74.3, 360/74.4, 74.5, 74.6, 74.7, 96.2, 137; 226/11, 174, 178, 188; 242/190

[56] References Cited

U.S. PATENT DOCUMENTS

| | | | |
|---|---|---|---|
| 4,101,941 | 7/1978 | Tanaka | 360/74.1 |
| 4,224,647 | 9/1980 | Umezawa et al. | 360/74.1 X |
| 4,225,894 | 9/1980 | Fulukawa et al. | 360/74.1 X |
| 4,229,722 | 10/1980 | Muramatsu | 360/74.2 X |
| 4,291,348 | 9/1981 | Pera | 360/96.2 X |
| 4,319,291 | 3/1982 | Drubeck et al. | 360/74.1 X |
| 4,351,498 | 9/1982 | Iwata et al. | 360/74.2 X |
| 4,386,381 | 5/1983 | Itai | 360/74.2 |

FOREIGN PATENT DOCUMENTS

| | | | |
|---|---|---|---|
| 55-1679 | 1/1980 | Japan | 360/74.1 |
| 55-38632 | 3/1980 | Japan | 360/74.1 |
| 56-156947 | 12/1981 | Japan | 360/74.1 |

*Primary Examiner*—Harvey C. Hornsby
*Attorney, Agent, or Firm*—Guy W. Shoup

[57] ABSTRACT

Herein disclosed is an auto-reverse mechanism for a tape recorder, in which a switching plate is slid by the rotations of a reverse gear adapted to intermittently rotate following the rotations of a motor so that it switches pinch rollers thereby to change the running direction of a magnetic tape. The reverse gear is formed with first and second guide portions which are defined by cam protrusions. A cam plate for imparting an initial rotation to the reverse gear and for rotations in selective engagement with the first and second guide portions is equipped with a drive member for sliding a lock plate for locking a fast forward lever or a rewinding lever so that the lock plate is slid, when the cam plate engages with the first guide portion of the reverse gear, but not when the cam plate engages with the second guide portion.

6 Claims, 6 Drawing Figures

AUTO-REVERSE MECHANISM FOR TAPE RECORDERS

BACKGROUND OF THE INVENTION

The present invention relates to a tape recorder and, more particularly, to an auto-reverse mechanism for the tape recorder.

SUMMARY OF THE INVENTION

It is an object of the present invention to provide an auto-reverse mechanism for a tape recorder, in which a reverse gear can have its guide portion separately used for reproducing and fast forward operations so that the reliability and quality may be improved while eliminating useless operations.

According to a feature of the present invention, there is provided an auto-reverse mechanism for a tape recorder, in which a switching plate is slid by the rotations of a reverse gear adapted to intermittently rotate following the rotations of a motor so that it switches pinch rollers thereby to change the running directions of a tape. The reverse gear is formed with first and second guide portions defined by cam protrusions, and a cam plate for imparting an initial rotating to said reverse gear and for rotations in selective engagement with said first and second guide portions. The reverse gear is equipped with a drive member for sliding a lock plate for locking a fast forward lever or a rewinding lever so that said lock plate is slid, when said cam plate engages with the first guide portion of said reverse gear, but is not slid when said cam plate engages with the second guide portion of said reverse gear.

BRIEF DESCRIPTION OF THE DRAWINGS

Other objects and advantages of the present invention will become apparent from the following description taken in conjunction with one embodiment thereof with reference to the accompanying drawings, in which.

DESCRIPTION OF THE PREFERRED EMBODIMENT

Figure 1:
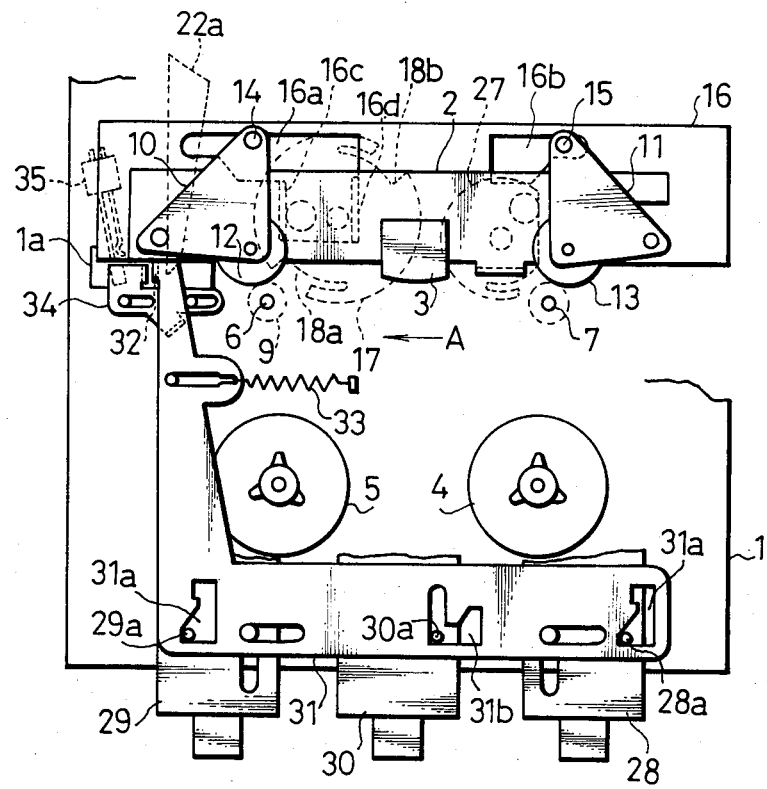
FIG. 1 is a top plan view of the embodiment.
Figure 2:
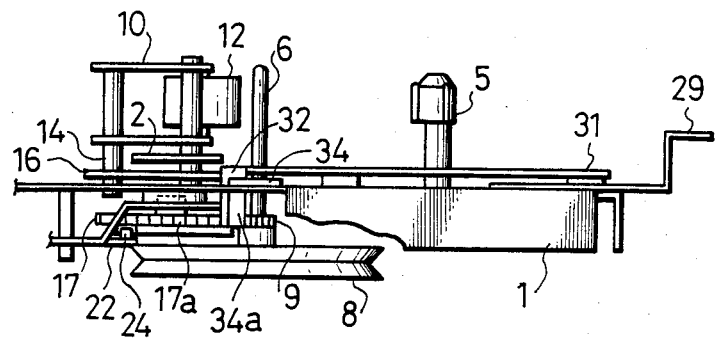
FIG. 2 is a side elevation.
Figure 3:
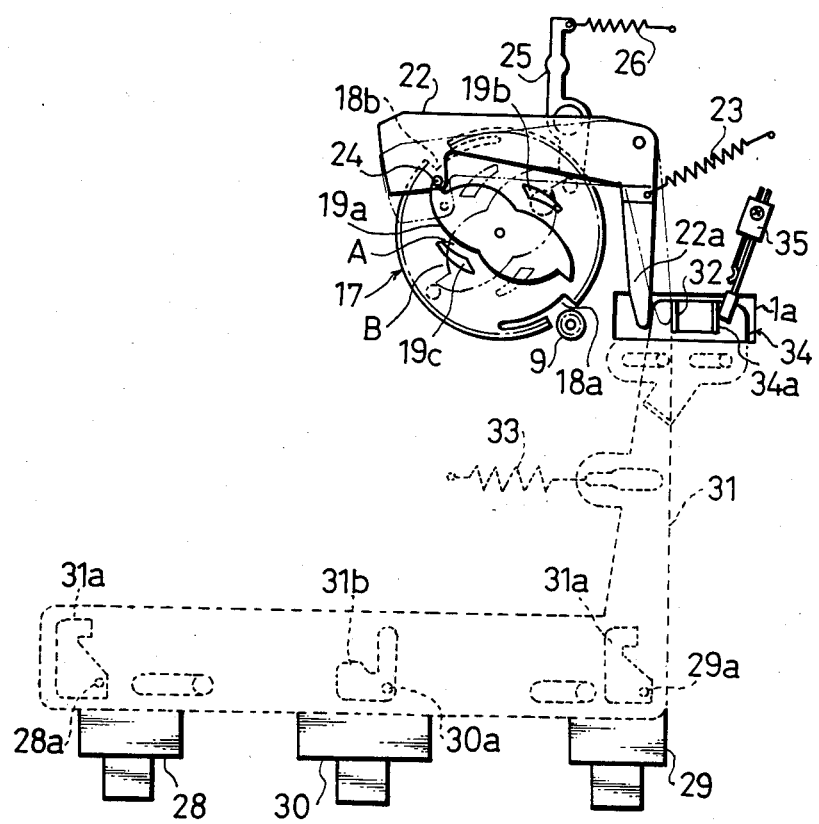
FIG. 3 is a bottom view showing an essential portion.
Figure 4:
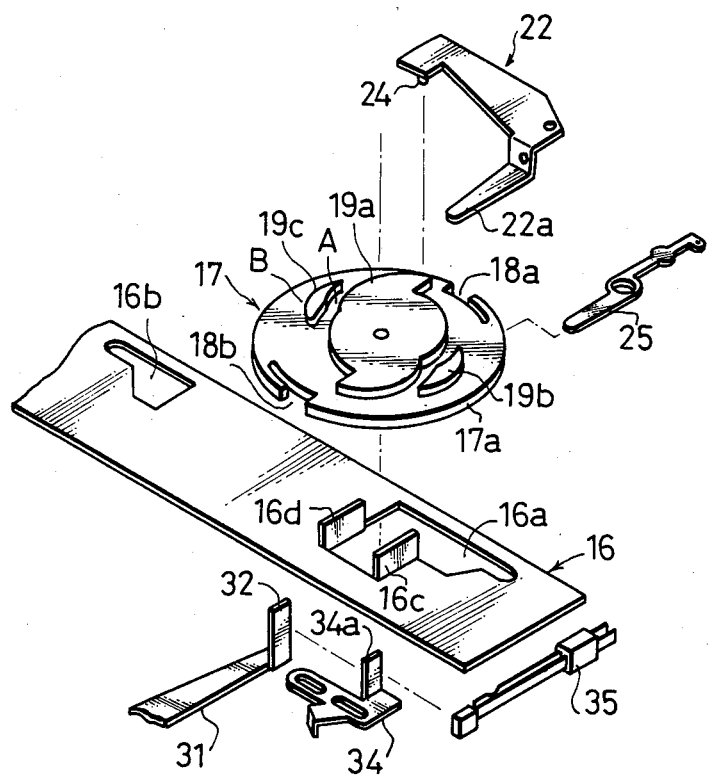
FIG. 4 is an exploded perspective view showing an essential portion.
Figure 5:
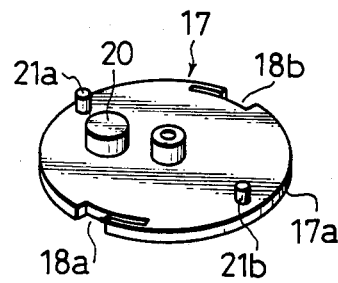
FIG. 5 is a perspective view showing a reverse gear.
Figure 6:
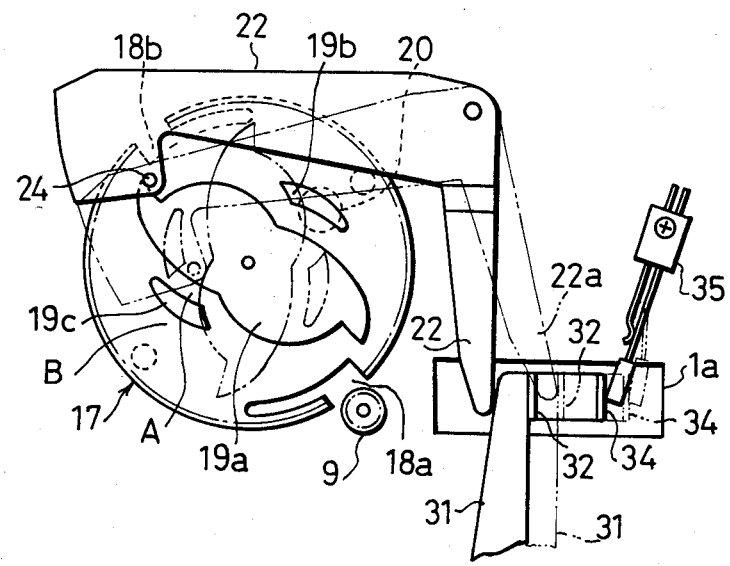
FIG. 6 is a view illustrating the operations of the embodiment.

One embodiment of the present invention will be described in detail with reference to FIGS. 1 to 6. Reference numerals 1 and 2 appearing in the drawings respectively indicate a chassis and a head base which is slidably mounted on the chassis 1. Numeral 3 indicates a magnetic head which is mounted on the head base 2. Numerals 4 and 5 indicate let-off and take-up reel shafts, which are rotatably mounted on the chassis 1, or vice versa. Numerals 6 and 7 indicate capstan shafts each of which is equipped at its one end with a fly-wheel (although only one is shown). Numeral 9 indicates a drive gear which is so integrated with the fly-wheel 8 as to rotate following the rotations of a motor (although not shown). Numerals 10 and 11 indicate pinch roller holding frames which are rotatably mounted on the chassis 1 so that they can move in accordance with the movement of the head base 2. Numerals 12 and 13 indicate pinch rollers which are rotatably mounted in the holding frames 10 and 11 and one of which is adapted to coact with one of the capstan shafts 6 and 7 thereby to run a magnetic tape forward or backward. Numerals 14 and 15 indicate regulating pins which are mounted in the holding frames 10 and 11 and which are made so engageable with a later-described switching plate as to switch the pinch rollers 12 and 13. The switching plate 16 is slidably attached to the chassis 1 and is formed with cam holes 16a and 16b, which are made engageable with the regulating pins 14 and 15, and with upright members 16c and 16d, as shown in detail in FIGS. 1 and 4. Numeral 17 indicates a reverse gear which is rotatably mounted in the chassis 1 such that it is made intermittently engageable with the drive gear 9 which is integrated with the fly-wheel 8. More specifically, the reverse gear 17 has its gear portion 17a partially removed to form tooth-notched portions 18a and 18b and its one side formed with cam protrusios 19a, 19b and 19c which are provided with first and second guide portions A and B, as better seen From FIGS. 4 and 5. The other side of the reverse gear 17 is integrally formed with a pin 20 in a position eccentric to the center of rotation and with stopper pins 21a and 21b in positions rotationally spaced substantially one quarter rotation from the tooth-removed portions 18a and 18b, respectively. Moreover, the pin 20 is made engageable with the upright members 16c and 16d which are formed on the switching plate 16. With specifcic reference to FIGS. 3 and 4, numeral 22 indicates a cam plate which is made operative to impart an initial rotation to the aforementioned reverse gear 17 and which is usually biased counter-clockwise of FIG. 3 by a spring 23. Numeral 24 indicates a pin which is so formed on the cam plate 22 as to engage with the cam protrusion 19a of the reverse gear 17. Numeral 25 indicates a stop lever which is adapted to abut against one of the stopper pins 21a and 21b formed on the aforementioned reverse gear 17 thereby to stop the rotations of the reverse gear 17. The stop lever 25 thus constructed is actuated by a solenoid for detecting the trailing end of a magnetic tape and for being operated by a reverse button. Numeral 26 indicates a return spring for the stop lever 5. Reference numeral 27 appearing in FIG. 1 indicates a cam gear for bring the head base 2 into a play position. This cam gear 27 is intermittently rotated by the drive of a motor (although not shown). Numerals 28, 29 and 30 indicate a rewinding lever, a fast foward lever and a stop and eject lever, respectively, all of which are slidably attached to the chassis 1. Numeral 31 indicates a lock plate for retaining the aforementioned rewinding and fast forward levers 28 and 29 in their operative positions. The lock plate 31 is formed with cam holes 31a and 31a for retaining the retaining pins 28a and 29a, which are respectively mounted on the rewinding lever 28 and the fast forward lever 29, and with a cam hole 31b which is made engageable with the release pin 30a of the stop and eject lever 30. Moreover, the lock plate 31 slides in a direction to intersect at a right angle the sliding direction of aforementioned respective levers 28 to 30. Numeral 32 indicates a release member which is mounted on the lock plate 31 and with which the drive member 22a of the cam plate 22 is brought into or out of engagement. Numeral 33 indicates a spring which is adapted to bias the lock plate 31 in one direction and which has a stronger spring force than that of the spring 23 for biasing the aforementioned cam plate 22. Numeral 34 indicates a switch lever which is slidably mounted in the chassis 1. Numeral 34a indicates an actuating member which is formed with the switch lever 34 such that it protrudes downward from a hole 1a formed in the chassis 1 until it faces the release member 32 of the lock plate 31. Numeral 35 indicates a switch for operating a solenoid which is made operative to retain the cam gear 27 for moving the head base 2 in a predetermined position, although not specifically shown. Thus, the cam gear 27 is rotated to return the head base 2 from the play position to a stop position by turning on and off said switch 35.

The operations of the auto-reverse mechanism according to the present invention will be described in the following. First of all, when the cassette is set in a predetermined position, the motor is rotated to rotate the cam gear 27 so that the head base 2 is moved to the play position. In accordance with this movement of the head base 2, the pich rollers 10 and 11 are rotated so that one of the pinch rollers 12 and 13, e.g., the pinch roller 12 is brought into engagement with the capstan shaft 6 thereby to run the magnetic tape in the direction of arrow (i.e., in the forward direction).

In this state, therefore, the regulating pin 15 mounted on the pinch roller holding frame 11 is rotationally regulated midway of its rotations by the action of the cam hole 16b which is formed in the switching plate 16. In order to switch the running direction of the tape in this reproducing state, the solenoid is magnetized, if the reverse button (although not shown) is depressed, so that a plunger (although not shown) is attracted to release the retention of the reverse gear 17 by the stop lever 25. When this retension by the stop lever 25 is released, the reverse gear 17 is slightly rotated by the elastic force of the spring 23 for biasing the cam plate 22 so that it comes into engagement with the drive gear 9 and is driven to make a half rotation by the rotating force of the drive gear 9. At this time, the pin 20 of the reverse gear 17 abuts against the upright member 16d, which is formed on the switching plate 16, to move this plate 16 along the chassis 1. In accordance with this movement of the switching plate 16, the holding frame 10 is rotated backward by the cam hole 16a but the other holding frame 11 is rotated forward by the cam hole 16b. As a result, the pinch roller 13 abuts against the capstan shaft 7 to thereby reverse the running direction of the tape. At this time, moreover, the cam plate 22 pushing the reverse gear 17 has its pin 24 moving along the cam protrusion 19a of the reverse gear 17 but its drive member 22a abutting against the release member 32 of the lock plate 31, as indicated by a single-dotted line in FIG. 3. However, since the elastic force of the spring 33 for biasing the lock plate 31 is stronger than that of the spring 23 of the cam plate 22, this cam plate 22 is stopped, when it abuts against the release member 32 of the lock plate 31, so that the pin 24 moves apart from the cam protrusion 19a of the reverse gear 27 one half rotation through the second guide portion B, which provides the outer periphery of the cam protrusion 19b, thereby to bring the stopper pin 21b into abutment against the stop lever 25 until the reverse gear 17 stops to have its tooth-removed portion 18b facing the drive gear 9. As a result, the switch lever 34 is not moved to leave the switch 35 conductive so that the head base 2 is held in the play position.

Next, the following description is directed to the case in which the tape reaches its trailing end in the fast forward or rewinding state. If the fast forward lever 29 or the rewinding lever 28 is depressed, the retaining pins 28a and 29a are locked on the lock plate 31. At this time, the switch lever 34 is pushed to move bu the lock plate 31, as indicated by a single-dotted line in FIG. 6, so that the switch 35 is turned off to energize the solenoid, whereby the cam gear 27 is rotated to retract the head base 2 to the stop position. In this state, moreover, if the tape reaches its trailing end, the solenoid is magnetized to rotate the stop lever 25 so that the reverse gear 17 starts to rotate similarly to the aforementioned reproducing operation. At this time, the pin 24 of the cam plate 22 moves along the cam protrusion 19a of the reverse gear 17, but the lock plate 31 has moved rightwardly of FIG. 6. As a result, the pin 24 moves along the first guide portion A so that the cam plate 22 is forcibly rotated by the guide portion A thereby to further move the lock plate 31 rightwardly. Thus, the fast forward lever 29 or the rewinding lever 28 is released from its locked state by the lock plate 31 so that the respective levers 28 and 29 are returned by the spring. Simultaneously with this, moreover, the switching plate 26 is also moved backward likewise the aforementioned reproducing operation. As a result, the running direction is reversed to restore the reproducing operation.

In short, the cam protrusions 19a, 19b and 19c of the reverse gears 17 are separately used for the reproducing operation and for the fast forward or rewinding operation so that the reversing operation for the reproduction need not retract the head base 2. For the fast forward and rewinding operations, on the other hand, the reversing operation and the releases of the rewinding and fast forward levers 28 and 29 can be conducted.

As has been described hereinbefore, according to the present invention, the reverse gear 17 for sliding the switching plate 16 to switch the pinch rollers 12 and 13 is provided with the first and second guide portions A and B which are defined by the cam protrusions 19a, 19b and 19c, and the cam plate 22 for imparting the initial rotation to the reverse gear 17 and for rotations in selective engagements with the first and second guide portions A and B is equipped with the drive member 22a for sliding the lock plate 31 to lock the rewinding or fast forward lever 28 or 29 so that the aforementioned cam plate 22 slides the lock plate 31, when it engages with the first guide portion A of the reverse gear 17, but not when it engagement withe second guide portion B. By the use of the single reverse gear, therefore, the switching operation of the pinch rollers can be effected for the reproducing operation, and both the swiching operation of the pinch rollers and the releasing operation of the fast forward and rewinding levers from the locked states can be conducted. As a result, there arises an effect that the running direction of the tape can be reversed without fail at the end of the fast forward or rewinding operation.

What is claimed is:

1. An auto-reverse mechanism for a tape recorder comprising:
   a pair of pinch rollers selectively movable against an associated capstan for running a tape respectively in one direction or the other;
   a switching plate for selectivly moving said pinch rollers to switch the running direction of the tape;
   a fast forward lever and a rewinding lever selectively operable to effect fast forwarding or rewinding, respectively, of the tape, each said lever having locking means thereon;

a lock plate having locking sections engageable by said locking means, respectively, for sliding said lock plate to a detent position and thereby retaining said locking means so as to lock a respective lever upon operation thereof, said lock plate being further movable to a release position so as to unlock the respective lever;

a reverse gear for operating both said switching plate and said lock plate in a selected sequence having first and second guide portions defined by cam protrusions and a switching pin for engaging said switching plate;

a cam plate having first means for imparting an initial rotation to said reverse gear and for selectively engaging said first and second guide portions, and second means including a drive member for sliding said lock plate to the release position to unlock the fast forwarding or rewinding lever when said first means engages said first guide portion of said reverse gear, and for not sliding said lock plate when said first means engages said second guide portion of said reverse gear.

2. An auto-reverse mechanism according to claim 1, wherein said first and second guide portions are provided by protruding island-shaped cam protrusions on one side of said reverse gear.

3. An auto-reverse mechanism according to claim 1, wherein said cam plate has a pin protruding from one end thereof and is so biased by a spring as to swing toward the center of said reverse gear.

4. An auto-reverse mechanism according to claim 1, wherein said reverse gear has said switching pin protruding in a position eccentric to the center of rotation on its side other than that of said guide portions and stopper pins protruding from said other side thereof.

5. An auto-reverse mechanism according to claim 4, wherein a stop lever, which is adapted to be actuated by a solenoid for detecting the trailing end of a magnetic tape or for being operated by a reverse button, is brought into abutment against either of said stopper pins.

6. An auto-reverse mechanism according to claim 1, wherein said cam plate is slidably mounted on a chassis and is formed with an actuating member which is arranged to face a release member of the lock plate.

* * * * *